UNITED STATES PATENT OFFICE.

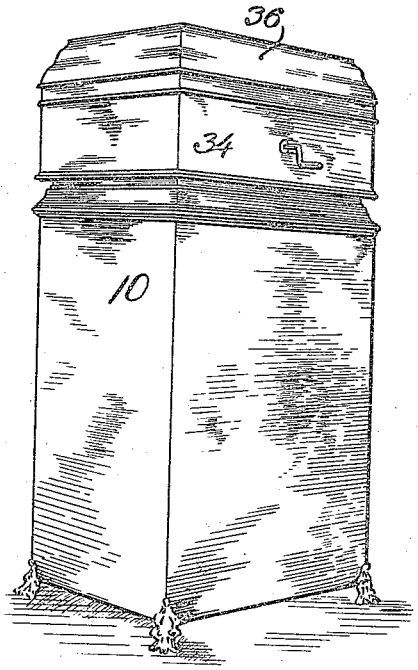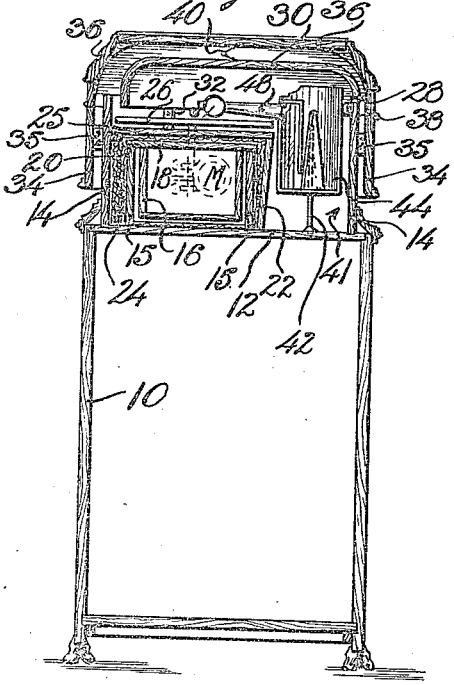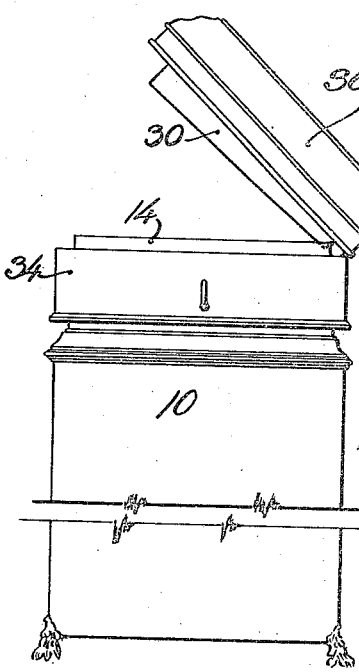

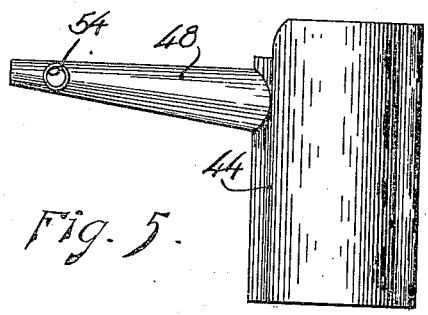
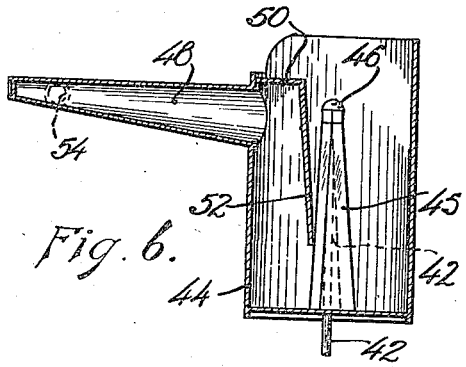
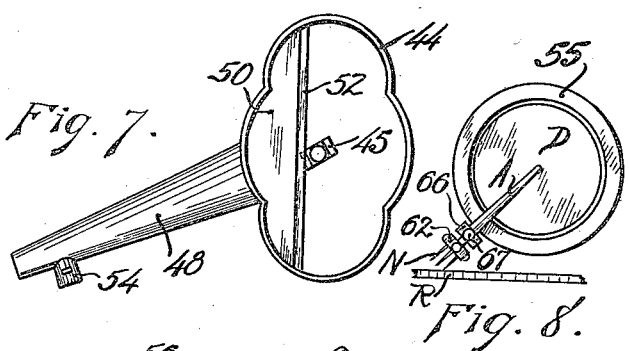
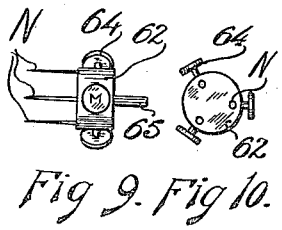
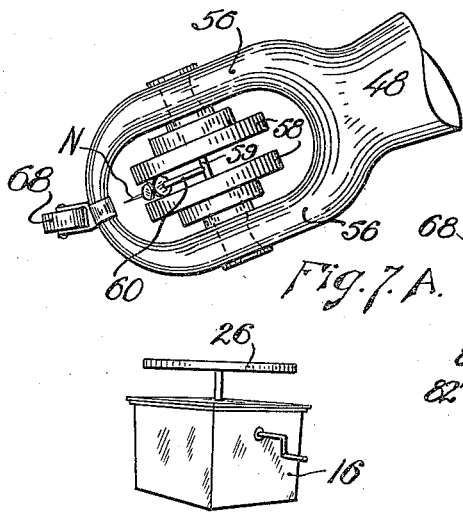
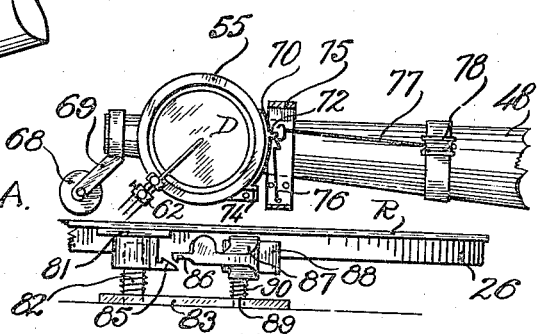
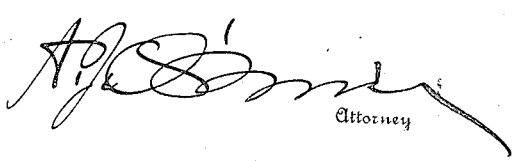

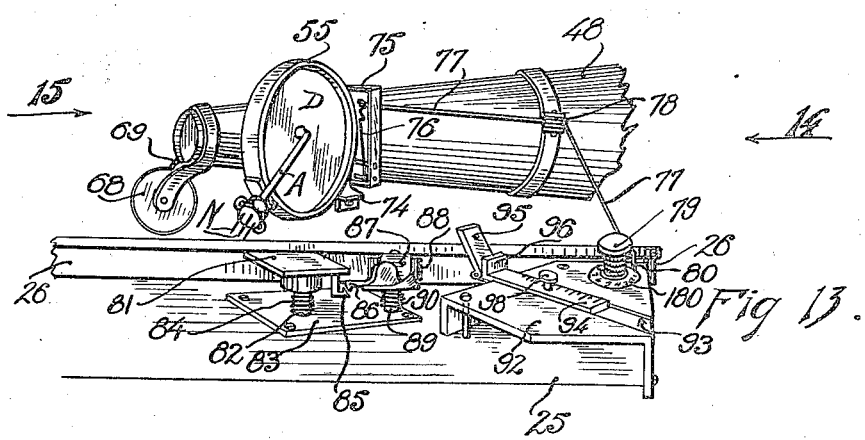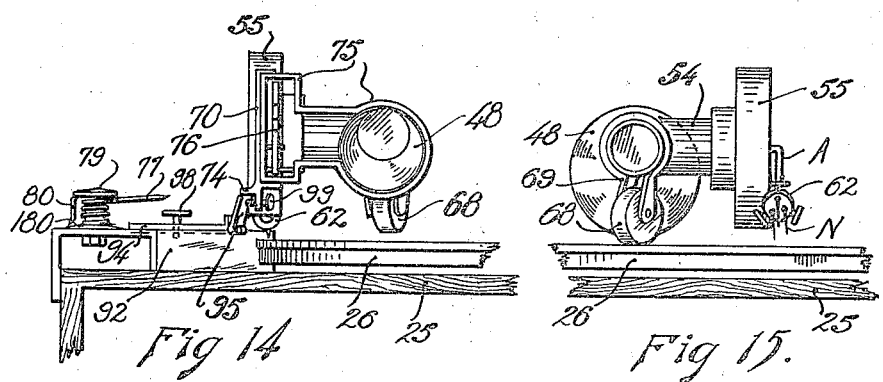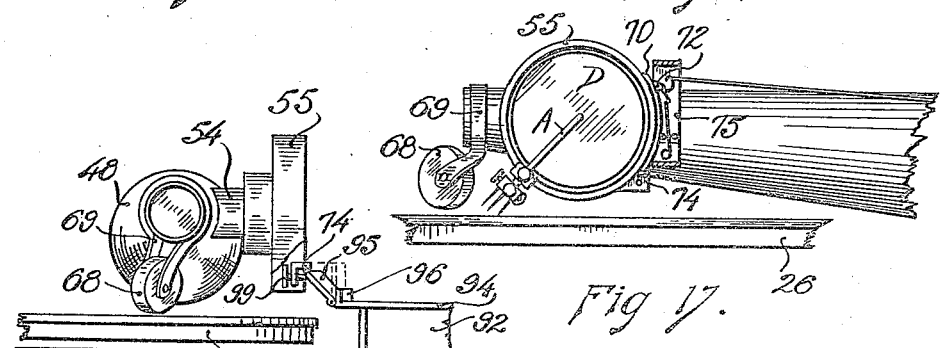

PETER J. LANDIN, OF DENVER, COLORADO.

PHONOGRAPH.

1,422,453. Specification of Letters Patent. Patented July 11, 1922.

Application filed September 23, 1920. Serial No. 412,262.

*To all whom it may concern:*

Be it known that I, PETER J. LANDIN, a citizen of the United States, residing at the city and county of Denver, and State of Colorado, have invented certain new and useful Improvements in Phonographs; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a phonograph which has superior means for transmitting the sound vibrations and which is so constructed as to almost entirely eliminate scratching and vibrations from the motor.

Briefly, the invention comprises a casing having the motor so mounted that the vibrations from its operation will be largely insulated from the body of the casing and their transmission almost entirely eliminated. The amplifying member, which has direct connection with the tone arm, is rigidly connected with said tone arm and moves therewith upon a pivot, and the tone arm preferably carries a plurality of sound boxes. A partition is provided in the amplifier for conducting the sound waves through a tortuous path. The casing is provided with a hinged hood and a hinged cover above said hood. The main wall of the upper portion of the casing extends above the lower edges of the hood and the cover when the same are in lowered position. In this manner the further passage of the sound waves is along a tortuous path, so that when said waves finally leave the instrument they are so mellowed and softened as to produce superior results and at the same time eliminate all scratching and other foreign sound vibrations. The invention also comprises means for returning the tone arm to the beginning of the record, either for resetting the same or for stopping the instrument. The resetting and returning is accomplished by means which release the sound box at the end of the record so that the needle swings upward away from the record, allowing a roller on the tone arm to settle on the record.

The roller is set at a slight angle to the tangent to the arcs of the grooves of the record, said angle being directed outwardly, whereby rotation of the record causes the roller to rotate in the opposite direction and travel outwardly from one groove to the next across the face of the record. When the machine is to be stopped, the roller runs upon a small platform at the edge of the turn-table, whereby the weight of the tone arm depresses the platform and releases a brake which engages the turntable and stops the same. When the instrument is to be re-set for playing the same record again, an arm at one side of the turntable is projected to a position so as to engage a foot upon the sound box. Said arm is pivoted so as to swing from an inclined position upward to a vertical position after engagement by said foot. In this manner the foot is elevated and the sound box is rotated to move the needle downward into engagement with the record, where it is caught by the releasing mechanism above described, the roller thereby being elevated from the record. The needle then proceeds to travel over the record again in the ordinary manner.

In the drawings:

Fig. 1 is a perspective view showing the complete instrument.

Fig. 2 is a vertical section from front to rear through the instrument.

Fig. 3 is a side elevation showing the hood and cover lifted.

Fig. 4 is a plan with the hood and cover removed.

Fig. 5 is an elevation of the amplifier and its tone arm.

Fig. 6 is a vertical section through the amplifier and tone arm.

Fig. 7 is a plan thereof.

Fig. 7ᴀ shows a modified form of tone arm and sound box.

Fig. 8 is an elevation of the usual sound box provided with a specific needle holder of the present invention.

Fig. 9 is an elevation of said needle holder.

Fig. 10 is an end view thereof.

Fig. 11 is a fragmentary elevation showing the releasing means for the sound box and the stopping means for the turntable.

Fig. 12 is a detail of the motor unit.

Fig. 13 is a perspective showing the tone arm, sound box, stopping means, and resetting means.

Fig. 14 is a view looking in the direction of the arrow 14 of Fig. 13.

Fig. 15 is a view looking in the direction of arrow 15 of Fig. 13.

Fig. 16 is a view similar to that of Fig. 15, showing said sound box as it is about to engage the resetting means.

Fig. 17 is a detail elevation of the releasing means for the sound box.

The phonograph comprises a case 10 of the usual type, which may constitute a storage space for records, if desired. This casing has a base 12, from the upper face of which is extended the main walls 14 of the reproducing chamber. Within the walls 14 and at the front of said chamber there are provided motor supporting walls 15 for carrying the motor casing 16. This casing has a suspended board 18, from which the motor M is suspended. The edges of said board 18 rest upon the upper portions of the walls 15, a rubber gasket 20 being mounted upon the upper portions of said walls 15 to directly engage the board 18 and insulate vibrations of the motor from the walls 15 and base plate 12 as much as possible. At the rear of the motor housing an upstanding wall 22 is provided, and insulating material 24 is packed in all around the motor housing and between the adjacent walls 14 and 22, insulation 24 upon the top of the board 18 being retained by means of a top plate 25 through which the spindle of the motor projects which carries the turntable 26.

Upon the top edge of the rear wall 14 there is hinged at 28 a hood 30. This hood has its front and sides depending below the upper edges of the front and side walls 14, and the forward portion of said hood is supported as by means of blocks 32 upon said top plate 25. An outer set of walls 34 is spaced from the walls 14 and supported thereupon as by means of blocks 35 at the corners. A cover 36 is hinged at 38 to the rear outer wall 34 and is adapted to have its side and front edges rest upon the corresponding edges of the front and side walls 34. A link connection 40 is provided between the tops of the hood 30 and cover 36, so that the cover 36 may be elevated slightly more than the hood 30. In this manner the cover 36 may be elevated a short distance without elevating the hood 30 at all, for a purpose hereinafter described.

At the rear of the wall 22 which encloses the motor chamber, a narrow chamber 41 is provided and a pivoted spindle 42 projects upwardly from about the middle of the bottom of this chamber, which bottom is the base plate 12, for the purpose of pivotally supporting the amplifier 44. This amplifier is provided with vertical side walls as shown, while its bottom wall is provided with an upstanding spindle receiving member 45 having a supporting tip 46 in which the point of the spindle 42 engages. A tone arm 48 is rigidly connected with the front side wall of said amplifier and extends forward at an angle as indicated in Fig. 7. A partition is mounted in said amplifier 44 which comprises a top wall 50 and a depending wall 52, which walls 50 and 52 span said amplifier 44. However, the lower end of said wall 52 is spaced from the bottom of the amplifier so that sound waves which are projected rearwardly through the tone arm 48 pass downward alongside said wall 52, rearward thereunder, and thence upward. The forward end of said tone arm 48 is provided with a connection 54 for a sound box 55 of the well known type, which has a diaphragm D, a needle arm A, and needles N for engaging the record R. The amplifier and tone arm may satisfactorily be made of fiber. However, as a preferred form of this invention, the tone arm 48 is divided to provide two auxiliary arms 56, to each of which a sound box 58 is attached. These sound boxes may be of conventional type, with the exception that a special needle arm is provided, comprising a transverse member 59 whose ends are mounted in the diaphragms of the two sound boxes 58. From the middle of this member 59 the needle arm proper 60 extends downward where it is conventionally mounted upon one of the sound boxes 58 and provided with means for carrying needles N.

Preferably the type of needle holder comprises a holding base 62 provided with three sockets, each of which has a set screw 64 to bind the needle N. The object of the three sockets is to carry soft, medium, and loud needles. The base 62 is provided with a stem 65 to be received in the ordinary needle holder 66 and retained by means of the common set screw 67. By this construction such volume as may be desired may be had merely by loosening the screw 67 and adjusting the holding base 62 to present the required needle.

In order to return the tone arm 48 to the outer edge of the record R, said tone arm is provided adjacent its free end with a roller 68 mounted on a carrying bracket 69, said roller being set at a slight angle to the longitudinal axis of the tone arm 48, so that said roller will be directed rearward and outward at all times at a slight angle to the tangent of any arc of the record grooves, whatever the position of said roller may be as it travels outward. In this manner when the roller is lowered on to the revolving record and is thereby rotated, its rotation will cause it to travel gradually outward from one groove to the next until the roller reaches or leaves the outer edge of said record.

For the purpose of lifting the needle from the record the sound box 55 or 58, as the case may be, is provided on its rear side with a part 70 having a shoulder 72 adjacent its upper end and a laterally projecting foot 74 adjacent its lower end. These parts 70, 72, and 74 have sufficient weight to overbalance the said sound box so that when released, it will rotate about its axis where it is mounted on the tone arm and thereby elevate the needle, allowing the roller 68 to drop onto the record. For the purpose of releasing said sound box a bracket 75 is secured to the tone arm 48, said bracket having an elongated spring 76 secured therein, the upper portion of said spring having a detent to engage the shoulder 72. The tension of said spring 76 is normally forward so as to be in position for engaging said shoulder 72. A cable 77 is connected to the extreme upper end of said spring 76 and extends rearwardly along the tone arm 48 into engagement with a roller 78 connected with the tone arm 48, and thence across the record to a post 79 about which said cable 77 is wound. This post is rotatably adjustable and has an index finger 80 cooperating with a dial 180, whereby the length of the extended portion of said cable 77 may be adjusted as required by the individual record. In this manner when the needle has reached the end of the record, the cable 77 is tensioned sufficiently to withdraw the spring 76 thereby releasing it from the shoulder 72 and allowing the sound box to be rotated as above described so that the roller 68 drops upon the record. For the purpose of stopping the turntable 26 said roller 68, when it leaves the record, will drop upon a small platform 81 mounted upon a pin 82 secured in a plate 83 and spring controlled by means of a spring 84 above said pin 82 for normally retaining said platform 81 in uppermost position. Platform 81 has a depending arm provided with a hook 85 adapted to engage and retain a hook 86 on a swinging block 87 provided with a brake shoe 88 adapted to engage the depending flange of the turn table 26 to stop said turntable. Said block 87 is pivoted upon a pin 89 in the plate 83 and is urged towards braking position by means of a coil spring 90 upon said pin 89. Thus when the roller 68 falls upon the platform 81, the hook 85 will be released from the hook 86 and the spring 90 will cause the brake shoe 88 to engage and stop the turntable. Under these circumstances the resetting means about to be described, will be withdrawn.

For the purpose of resetting the sound box a stationary platform 92 is provided upon the top plate 25, this platform 92 having a dovetailed groove 93 in which there slides a bar 94 which has a trip 95 pivoted upon the outer end thereof. The swinging motion of said trip in a downward direction is limited to about the position indicated in Figure 13, and its swinging movement in the opposite direction is limited by an upstanding lug 96. A set screw 98 is provided in said bar 94 for the purpose of securing the same in adjusted position.

When desiring to reset the sound box the bar 94 is moved inward to a position where the foot 74 will ride up on the upper end of said trip 95 just before the roller 68 would leave the record. The roller 68 travels with such speed that the momentum of the sound box and tone arm is sufficient to cause said trip 95 to move from the solid line position shown in Figure 16 to the dotted line or vertical position. This causes the rear side of the sound box to be elevated a distance equal to the amount of elevation of the outer end of said trip 95. This is sufficient to bring the shoulder 72 high enough so that the detent on the spring 76 will engage beneath the same to lock the sound box against rotation in the opposite direction and also to lift the roller and the tone arm so that the roller 68 is disengaged from the record. The rebound is sufficient to cause the sound box to move in an opposite direction so that the needle end will be lowered upon the record, any tendency of the needle to fall, being prevented by reason of the pivotal connection with the trip 95 which will be returned from dotted line position and gently lower the needle. When this is being done, the turntable will be continuing its rotation so that repetition will begin as soon as the needle drops upon the record. For the purpose of adjusting the point of contact of the trip 95 with the foot 74, a set screw 99 is mounted in the back of said foot.

From the foregoing description it is believed that the operation of the stopping and resetting mechanism will be clear.

As to the arrangement of the amplifier and the hood and cover, it will be noted that when the same are in lowered position as in Figure 2, the sound waves will have a tortuous path, these waves starting from the tone arm 48, passing downwardly alongside the partition 52, under the same, upward through the amplifier into the chamber beneath the hood 30, thence downward under the edge of said hood 30, upward over the upper edges of the walls 14 into the chamber within the cover 36, and thence downward between the walls 14 and the walls 34, where they escape. This tortuous movement mellows the tone and results in a transmission of sound which is free from all scratching and vibration which the reproducing mechanism may have caused. In the event that a little more volume is required with a given needle, the cover 36 may be lifted to such an extent as the link 40 will permit, without lifting the hood 30. Obviously, if further volume is required, both the hood and the cover may be lifted, the hood being lifted through the medium of the cover and link 40. Thus, it will be seen that the hood and the cover together provide a plurality of tone chambers, one chamber being within each of these parts. These tone chambers assist materially in mellowing and softening the tone to produce the desired quality, thereby aiding the function of the amplifier.

I claim:

1. In a phonograph, a casing having upstanding walls, sound reproducing means within said walls, said means comprising a pivoted amplifier having a tone arm thereon, said amplifier opening within said walls, and a hooded sound deflecting member above said amplifier but spaced from certain of said walls for the passage of sound vibrations.

2. In a phonograph, a casing having upstanding walls, sound reproducing means within said walls, said means comprising a pivoted amplifier having a tone arm thereon, said amplifier opening within said walls, and a hooded sound deflecting member above said amplifier but spaced from certain of said walls for the passage of sound vibrations, and a second hooded deflecting member above and spaced from the other deflecting member and also spaced from said walls on the opposite side thereof from said other member, the lower edges of said members depending below the tops of said walls, whereby a tortuous path for sound is produced.

3. In a phonograph, a casing having upstanding walls, and sound reproducing means within said walls comprising an amplifier pivoted therewithin and a tone arm mounted on said amplifier, said amplifier being open at one end for the escape of sound within said walls, and closed at the other end, said amplifier having a partition therein spaced from the closed end thereof and spanning the amplifier transversely, the outer end of the partition extending to one wall of the amplifier at the open end thereof, whereby two chambers are formed within the amplifier, said tone arm being connected with the amplifier below the upper end of the partition.

4. In a phonograph, a casing having upstanding walls, outer walls spaced from said upstanding walls, a cover hinged to and adapted to close upon said outer walls, a hinged hood having its lower edges depending within said upstanding walls and below the tops thereof, and sound reproducing means below said hood within said walls comprising a pivoted amplifier opening within said walls and beneath said hood, and a tone arm connected with said amplifier.

5. In a phonograph, a casing, an amplifier mounted within said casing and opening therewithin, and a plurality of spaced hooded members having communication with the interior of said casing wherein said amplifier is mounted and thereby comprising a plurality of tone chambers communicating with said amplifier.

6. In a phonograph, a casing, an amplifier mounted in and opening within the casing, a hood hinged above the amplifier, a cover hinged above the hood, the spaces within the hood and the cover having communication with each other and with the space containing the amplifier for softening the tone.

In testimony whereof I affix my signature.

PETER J. LANDIN.